UNITED STATES PATENT OFFICE.

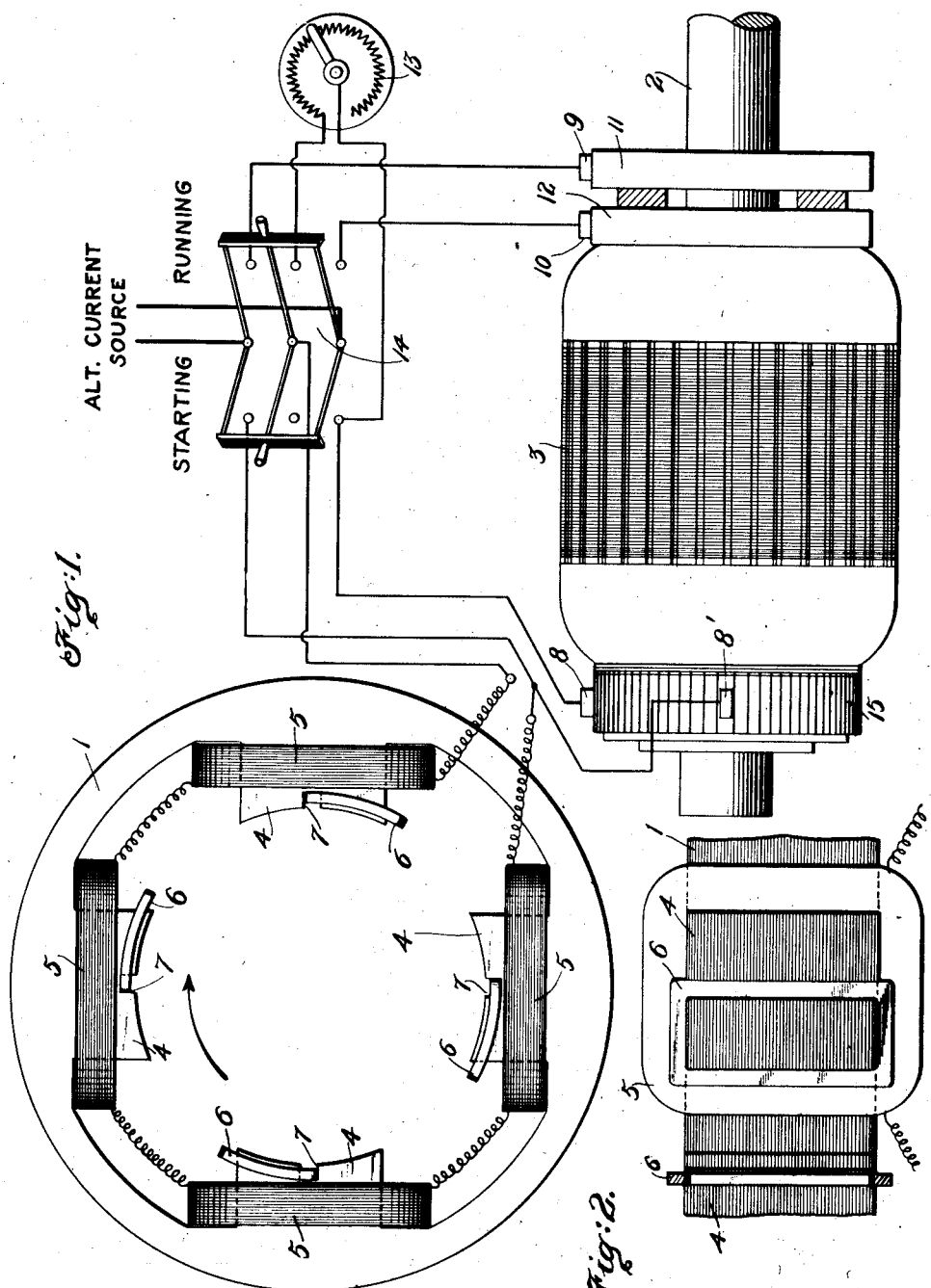

JAMES KNOX ELDERKIN, JR., OF NEWARK, NEW JERSEY, ASSIGNOR, BY MESNE ASSIGNMENTS, TO DAVID J. NEWLAND, OF YONKERS, NEW YORK.

SYNCHRONOUS ELECTRIC MOTOR.

1,255,721. Specification of Letters Patent. Patented Feb. 5, 1918.

Application filed February 17, 1916. Serial No. 78,880.

*To all whom it may concern:*

Be it known that I, JAMES KNOX ELDERKIN, Jr., a citizen of the United States, residing in the city of Newark, county of Essex, and State of New Jersey, have invented certain new and useful Improvements in Synchronous Electric Motors, of which the following is a specification, reference being had to the drawings accompanying and forming a part of the same.

My invention relates to synchronous electric motors and consists in improvements whereby these motors are caused to run in true synchronism with the generator of the currents which operate such motors. For the operation of numerous electrical devices, it is essential that the driving motor of the devices revolves in exact synchronism with the waves of the alternating current.

For instance it has been repeatedly demonstrated that the design of a vibrating or rotary rectifier for the purpose of charging storage batteries presents a difficulty not encountered in the design of a rectifier for other purposes. The difficulty being that the added voltage of the battery and of the alternating current supply is liable to follow any spark at the commutator in the form of a destructive arc. Such a spark is usually caused by the armature falling even slightly out of step with the impressed current due to change of voltage, power factor or frequency of the supply line. It is therefore essential to hold the armature in such close synchronism with the electrical speed of the supplying alternator, that no such spark can occur. The combination of such a motor with a rectifier of that type is shown in the copending application of Daniel J. Dobyns, Ser. No. 854,112.

I am not aware that alternating synchronous motors maintaining such close synchronism as to render same suitable for the purpose above outlined have been produced up to the present, nor that any other manner for producing such practically absolute synchronism has been successfully suggested. This lack of synchronism is particularly noticeable in synchronous motors below approximately fifteen horsepower, a class of motors which is particularly concerned for the purpose above stated. Such motors keep only approximate synchronism and in case of unusual variation of the power factor of the supply line or slight variation of the motor load itself they fall out of step and stop.

These disadvantages of synchronous motors are overcome by my invention to such an extent that, as exhaustive tests have proven, even at severe disturbances in the alternating current supplied, such as a sudden variation in cyclage up to 18% or a variation in power factor from 1 to 0.25, the motor under full load maintained practically absolute synchronism.

To avoid this so-called "hunting" of alternating current armatures it has been suggested heretofore to employ short circuited coils, so-called "shading coils" disposed on the field poles of the motor. I have found however, that for the purpose of obtaining practically absolute synchronism necessary for the purposes outlined above, such coils alone are entirely insufficient. The reason for this is that in such motors the field poles are usually designed for, and are used at or near the saturation point of the iron, so as to avoid, as far as possible, armature reaction.

The novel feature of my invention consists in making use of just this armature reaction, heretofore considered as detrimental, in combination with short circuted coils of low resistance mounted on the field poles, so that there is a magnetic lock formed between the armature and the field as will be explained later, which always holds the speed of the armature exactly at the point where it should be according to the cyclage of the alternating current supplied at the moment.

I take advantage of this armature reaction by using for my motor an unsaturated, weak field; in fact only strong enough to give the necessary mechanical torque to rotate the motor at synchronous speed under the load of the brush friction on the commutator and on the slip rings. I then place on the trailing halves of the field poles, short circuited coils of low resistance, preferably made in one turn of heavy copper.

In the accompanying drawings I have illustrated my invention.

Figure 1 represents the stator and rotor of a synchronous alternating current motor, taken apart but shown in the proper circuit connection.

Fig. 2 represents a face view of one of the field poles.

Referring to Fig. 1, 1 is the stator laminated, as shown in Fig. 2; 4 are the field poles, integral with the stator, on which the field coils 5 are mounted. The armature 3 with its shaft 2 revolves in the stator in the direction of the arrow, but it is shown here removed from the stator to more conveniently illustrate the circuit connections. Field poles 4 are slotted at their faces in the direction of the armature axis sufficiently deep to each fully receive one shank of a short circuited coil 6, preferably made of one turn of heavy copper and of sufficient size to fit over the trailing half of each field pole as shown. The field coils are all connected in series in this particular case.

The armature carries at one end a commutator 15 on which two brushes 8, 8' slide, and at the other end two slip rings 11 and 12 on which brushes 9 and 10 respectively slide.

For connecting the motor with an alternating current source a three pole change-over switch 14 is provided two of whose pivotal points are connected with the alternating current source. The wiring is shown sufficiently plain for anyone skilled in the art to understand that when the switch is thrown into the "starting" position, the motor operates as an inverted repulsion motor. When the motor in this switch position has attained the necessary speed, which is slightly above synchronous speed, the switch is thrown over into the "running" position. This operation connects the alternating current mains directly to the slip rings 11, 12, and the field coils to the commutator brushes by way of a field rheostat 13 through which the proper field intensity is regulated.

The theory according to which the magnetic lock above referred to, which means practically absolute synchronism, is brought about, I assume to be the following:

A short circuited coil of conductive material in the presence of an alternating or fluctuating magnetic field, tends to move out of the field or to revolve so as to include no lines of force. If the coil is fixed and the magnetic field capable of change of position, then the action will be to change the position of the field so that the coil will not be influenced by the changing lines of force.

When a synchronous motor runs at synchronous speed, the magnetic poles of the armature are fixed in space. Therefore in such cases the lines of force included by any of the short circuited or shading coils 6, are constant in direction and number, and have no influence on these coils. Should now any condition tend to change the position of the armature field in space, as a change in load, frequency of the alternating current supplied, or the like, there will tend to be a change in the number of lines of force included by the short circuited coil. Since the coil is fixed in position, its action will be to force the armature back into the original or no-change position.

Because of the fact that this coil is an integral part of the machine and is in the immediate vicinity of the armature, its reaction will be immediate and synchronism will be restored automatically and immediately.

Should, however, the fields be saturated as is the case in the customary construction of synchronous motors for the purpose of counteracting the armature reaction, their reluctance would be great, and therefore the effect of an armature reaction upon the shading coils for the present purpose would be so small, that with a saturated field the desired effect could not be obtained. I am not aware that the means for obtaining practically perfect synchronism as set forth in the annexed claims have been employed as pointed out before.

I claim:—

1. A synchronous alternating current motor having a plurality of unsaturated definite polar projections containing short circuited coils around their trailing face portions only, exciting coils around the upper portion of said polar projections, an armature adapted for connection to a source of alternating current, and provided with a commutator and windings connected thereto, and brushes bearing on said commutator and connected to said exciting coils to supply direct current thereto and cause them to be of definite polarity when the armature is at synchronous speed.

2. A synchronous alternating current motor having unsaturated field poles and short-circuited coils around the trailing face portions only of said poles, an armature, said coils being disposed in close proximity to said armature, a source of alternating current, and means for connecting said source with said armature.

JAMES KNOX ELDERKIN, JR.